US010256553B2

(12) United States Patent
Gallagher et al.

(10) Patent No.: US 10,256,553 B2
(45) Date of Patent: Apr. 9, 2019

(54) EFFICIENT MULTI-POLARIZATION COMMUNICATIONS

(71) Applicant: Maxlinear, Inc., Carlsbad, CA (US)

(72) Inventors: Timothy Gallagher, Encinitas, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 239 days.

(21) Appl. No.: 15/355,220

(22) Filed: Nov. 18, 2016

(65) Prior Publication Data

US 2017/0149144 A1 May 25, 2017

Related U.S. Application Data

(60) Provisional application No. 62/257,522, filed on Nov. 19, 2015, provisional application No. 62/257,671, filed on Nov. 19, 2015.

(51) Int. Cl.

| | |
|---|---|
| ***H04B 15/00*** | (2006.01) |
| ***H01Q 21/24*** | (2006.01) |
| ***H01Q 1/38*** | (2006.01) |
| ***H01Q 3/24*** | (2006.01) |
| ***H01Q 3/40*** | (2006.01) |
| ***H01Q 13/02*** | (2006.01) |
| ***H01Q 21/06*** | (2006.01) |

(52) U.S. Cl.
CPC ............ *H01Q 21/245* (2013.01); *H01Q 1/38* (2013.01); *H01Q 3/247* (2013.01); *H01Q 3/40* (2013.01); *H01Q 13/0258* (2013.01); *H01Q 21/064* (2013.01)

(58) Field of Classification Search
CPC combination set(s) only.
See application file for complete search history.

(56) References Cited

U.S. PATENT DOCUMENTS

2003/0008614 A1* 1/2003 Hanson .................... H04B 7/10 455/12.1
2013/0088391 A1* 4/2013 Corman ................... H04B 7/10 342/365

* cited by examiner

*Primary Examiner* — Tu X Nguyen
(74) *Attorney, Agent, or Firm* — McAndrews, Held & Malloy, Ltd.

(57) ABSTRACT

Methods and systems for efficient multi-polarization communications are presented. An array based communications system may comprises an antenna array operably connected to a first polarization path and a second polarization path. Each polarization path may comprise an analog frequency conversion circuit, a digital beamforming circuit, and a cross-polarization interference suppression circuit. To save power while communicating with one or more link partners, one or both of the first polarization path and the second polarization path may be selectively enabled or disabled in accordance with temperature, bandwidth, and/or power consumption requirements.

49 Claims, 16 Drawing Sheets

EFFICIENT MULTI-POLARIZATION COMMUNICATIONS

CROSS-REFERENCE TO RELATED APPLICATIONS/INCORPORATION BY REFERENCE

This patent application makes reference to, claims priority to, and claims the benefit from U.S. Provisional Application Ser. No. 62/257,522, which was filed on Nov. 19, 2015 and U.S. Provisional Application Ser. No. 62/257,671, which was filed on Nov. 19, 2015. Each of the above applications is hereby incorporated herein by reference in its entirety.

BACKGROUND

Limitations and disadvantages of conventional methods and systems for communication systems will become apparent to one of skill in the art, through comparison of such systems with some aspects of the present invention as set forth in the remainder of the present application with reference to the drawings.

BRIEF SUMMARY OF THE INVENTION

Systems and methods are provided for efficient multi-polarization communications, substantially as shown in and/or described in connection with at least one of the figures, as set forth more completely in the claims.

Advantages, aspects and novel features of the present disclosure, as well as details of an illustrated embodiment thereof, will be more fully understood from the following description and drawings.

DETAILED DESCRIPTION OF THE INVENTION

Figure 1A:
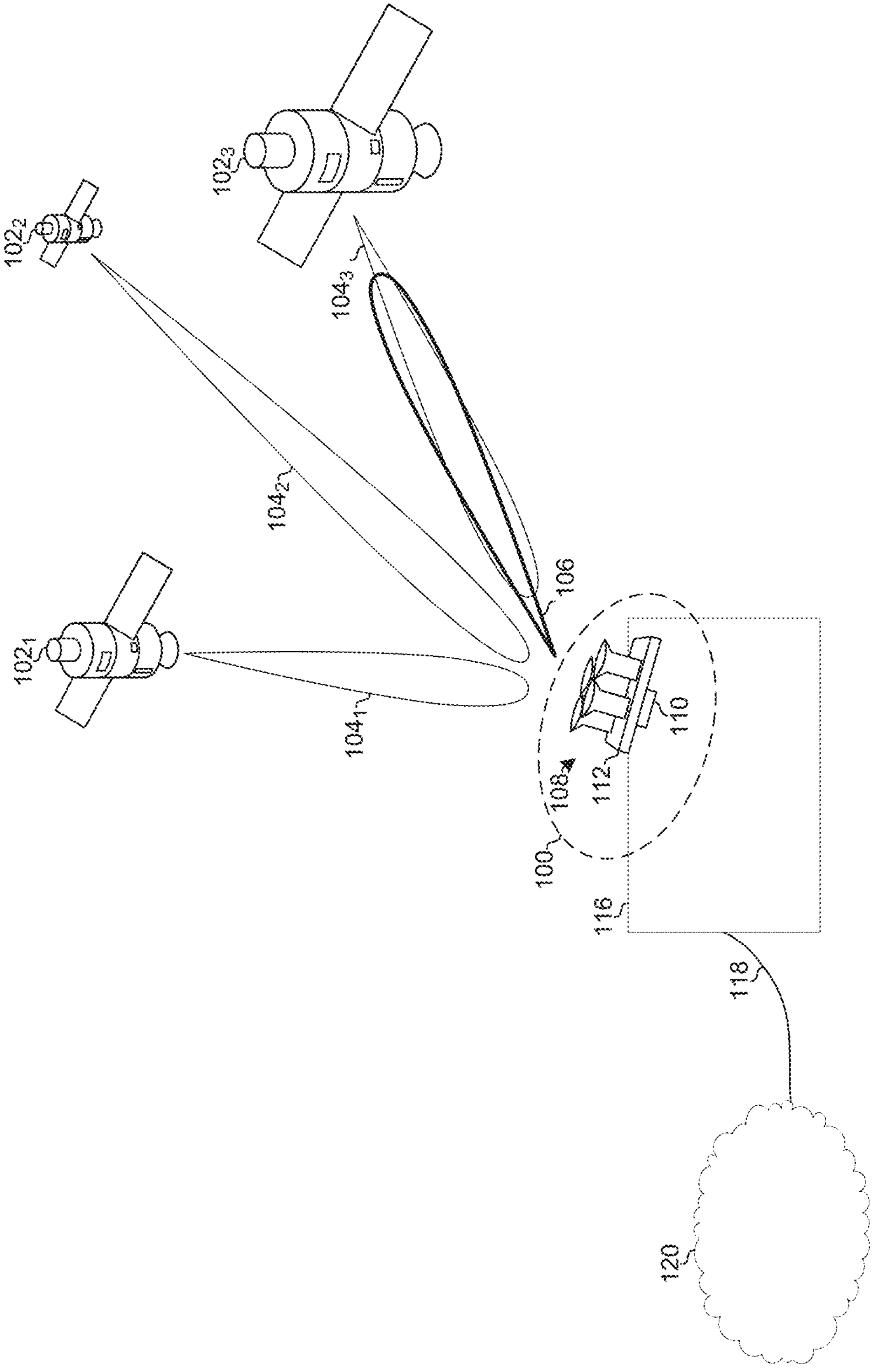
FIG. 1A shows a single-unit-cell transceiver array communicating with a plurality of satellites.

FIG. 1A shows a single-unit-cell transceiver array communicating with a plurality of satellites. Shown in FIG. 1A is a device 116 ("ground station") comprising a transceiver array 100 operable to communicate with a plurality of satellites 102. The device 116 may, for example, be a phone, laptop computer, or other mobile device. The device 116 may, for example, be a desktop computer, server, or other stationary device. In the latter case, the transceiver array 100 may be mounted remotely from the housing of the device 116 (e.g., via fiber optic cables). Device 116 is also connected to a network (e.g., LAN and/or WAN) via a link 118. Although not shown, each of the satellites 102 may comprise circuitry similar to or the same as the transceiver 100.

Figure 2A:
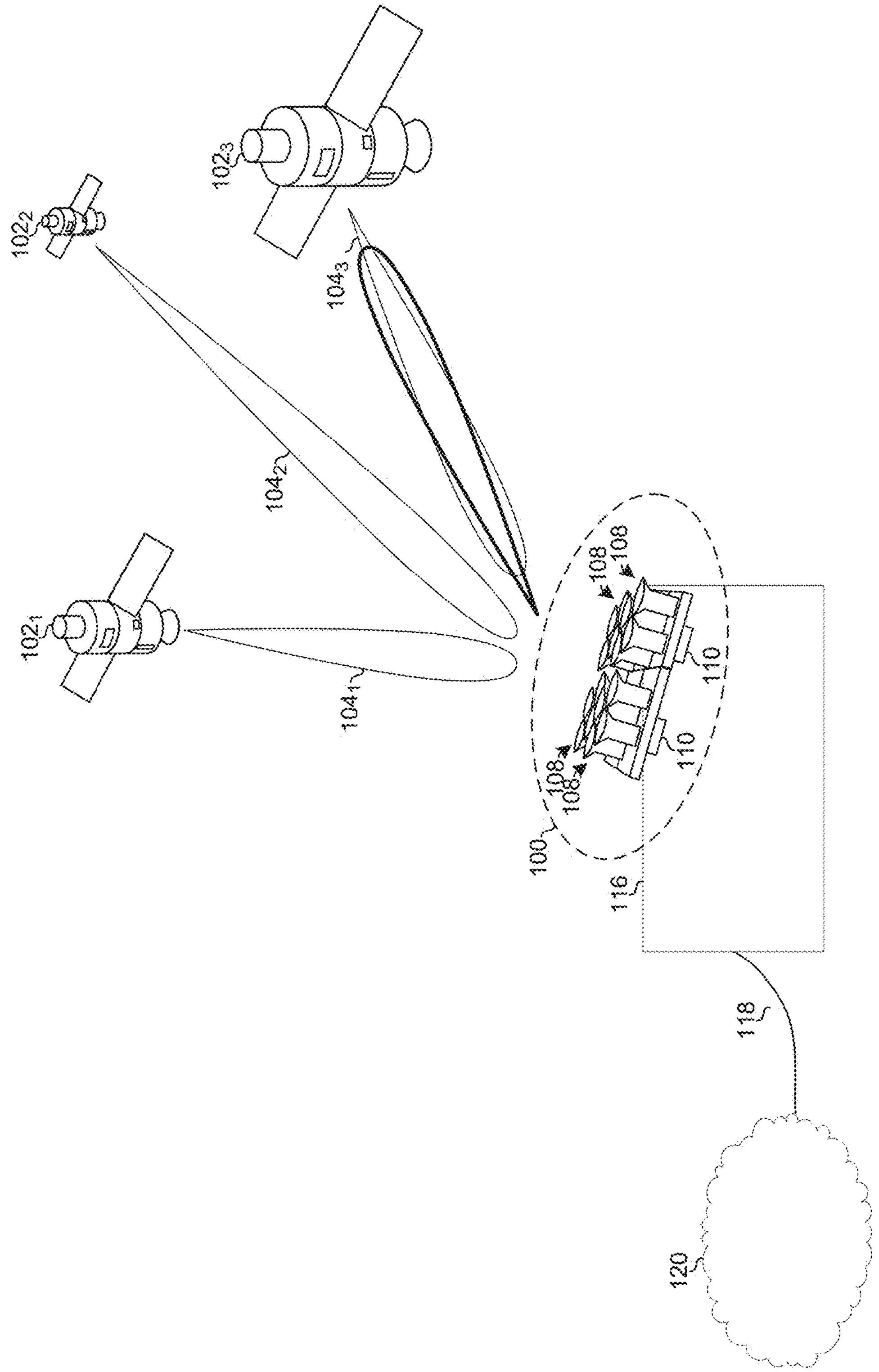
FIG. 2A shows a transceiver which comprises a plurality of the unit cells of FIG. 1B and is communicating with a plurality of satellites.

In an example implementation, the satellites 102 shown in FIGS. 1A and 2A are just a few of hundreds, or even thousands, of satellites having a faster-than-geosynchronous orbit. For example, the satellites may be at an altitude of approximately 1100 km and have an orbit periodicity of around 100 minutes.

Figure 3:
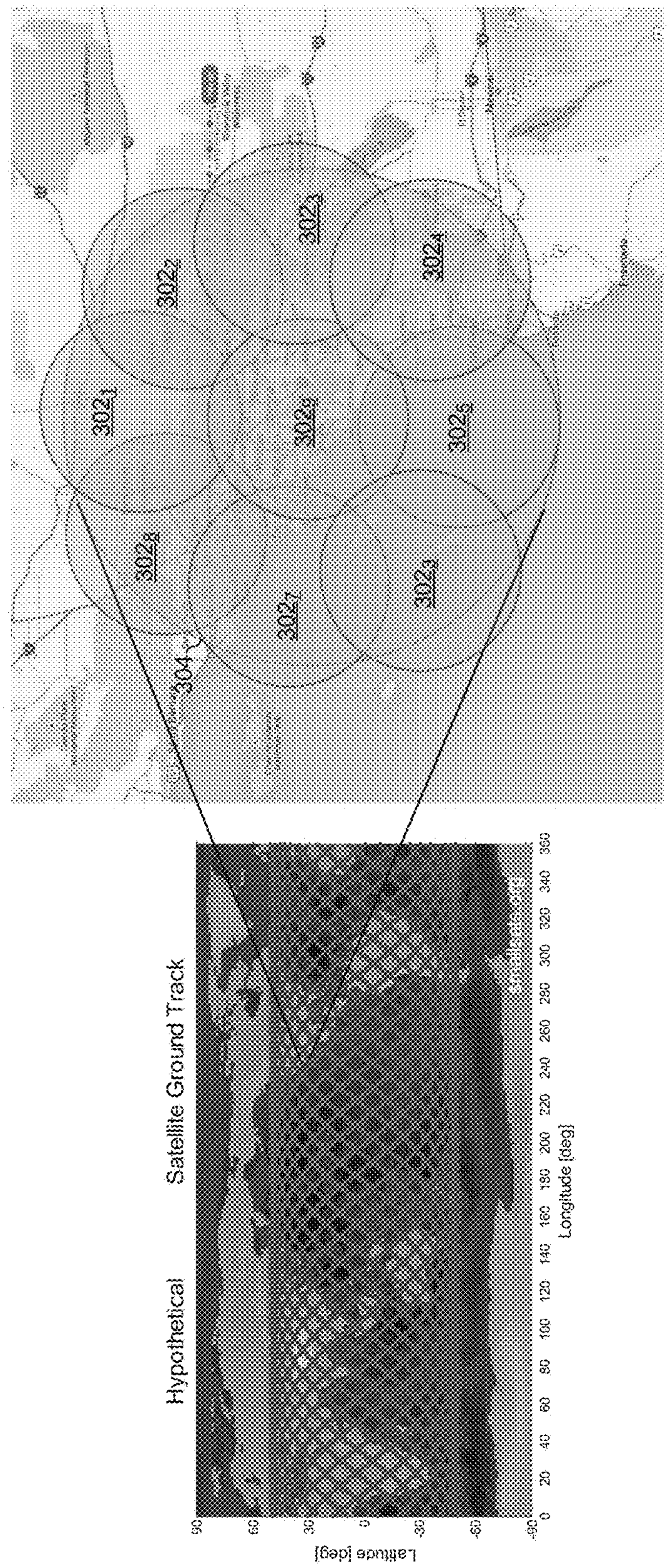
FIG. 3 shows a hypothetical ground track of a satellite system in accordance with aspects of this disclosure.

Each of the satellites 102 may, for example, be required to cover 18 degrees viewed from the Earth's surface, which may correspond to a ground spot size per satellite of ~150 km radius. To cover this area (e.g., area 304 of FIG. 3), each satellite 102 may comprise a plurality of antenna elements generating multiple spot beams (e.g., the nine spot beams 302 of FIG. 3). In an example implementation, each of the satellites 102 may comprise one or more transceiver array, such as the transceiver array 100 described herein, operable to implement aspects of this disclosure. This may enable steering the coverage area of the spot beams without having to mechanically steer anything on the satellite 102. For example, when a satellite 102 is over a sparsely populated area (e.g., the ocean) but approaching a densely populated area (e.g., Los Angeles), the beams of the satellite 102 may be steered ahead such that they linger on the sparsely populated area for less time and on the densely populated area for more time, thus providing more throughput where it is needed.

Figure 1B:
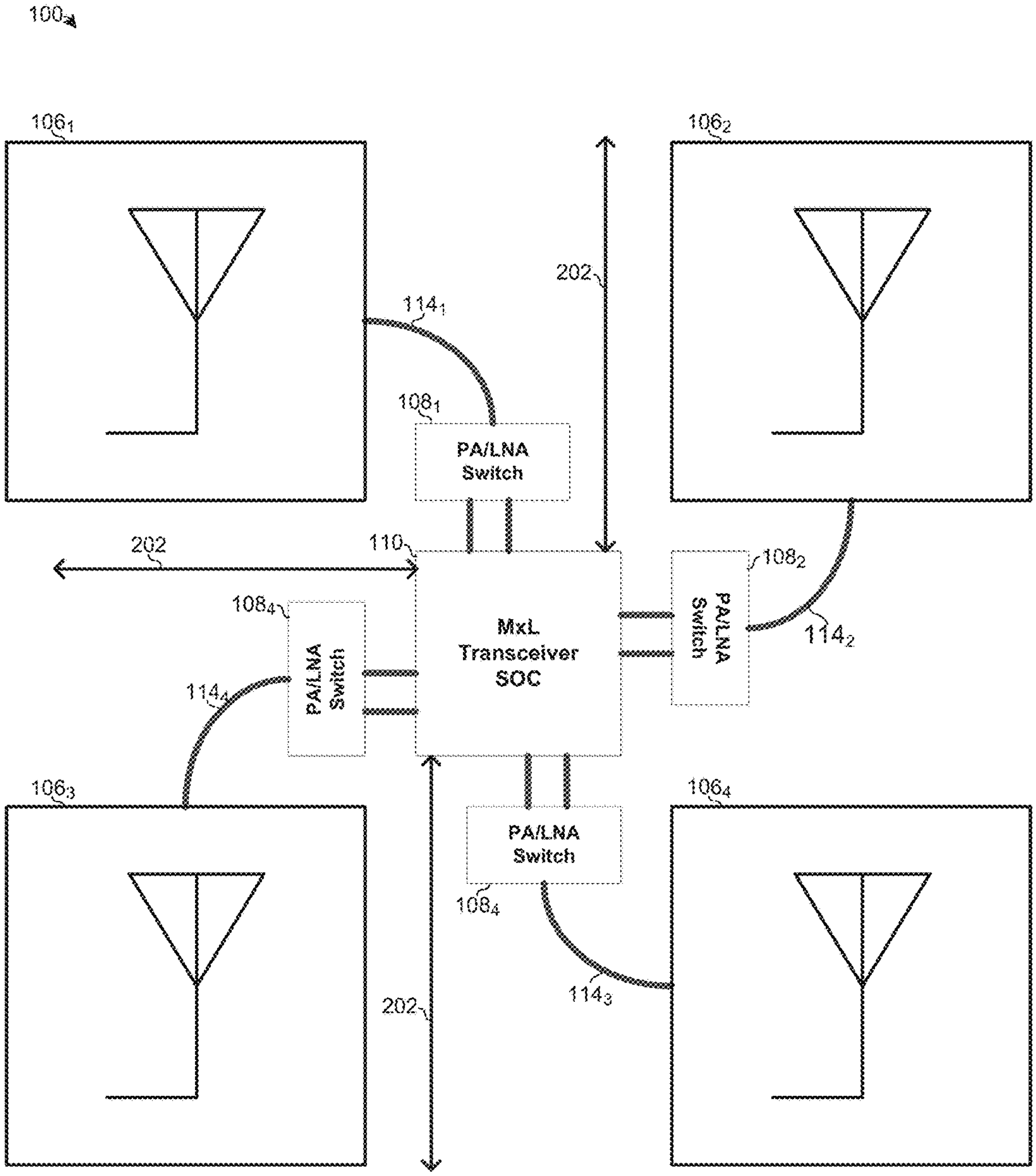
FIG. 1B shows details of an example implementation of the single-unit-cell transceiver array of FIG. 1A.
Figure 2B:
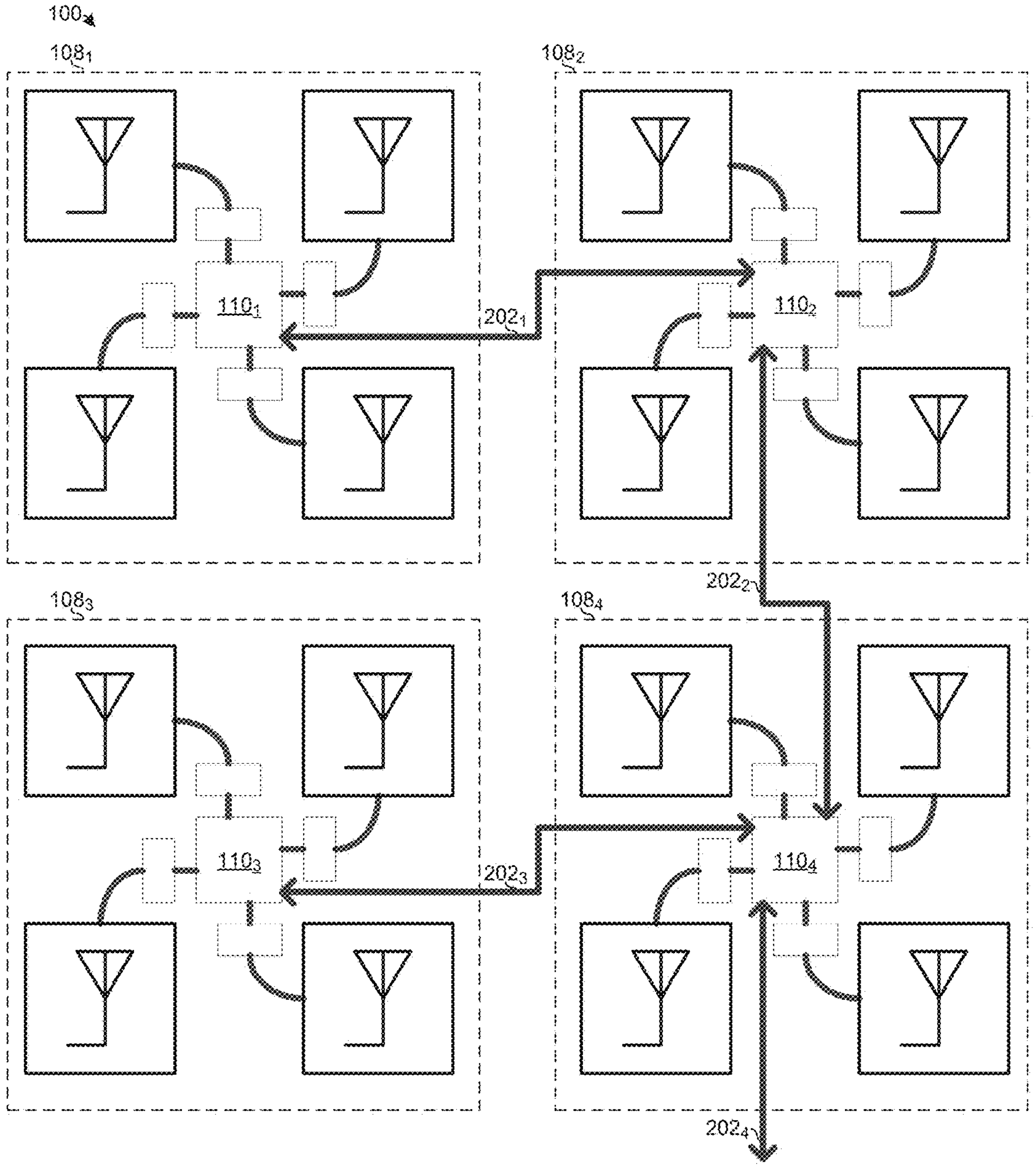
FIG. 2B shows details of an example implementation of the transceiver of FIG. 1A.
Figure 4A:
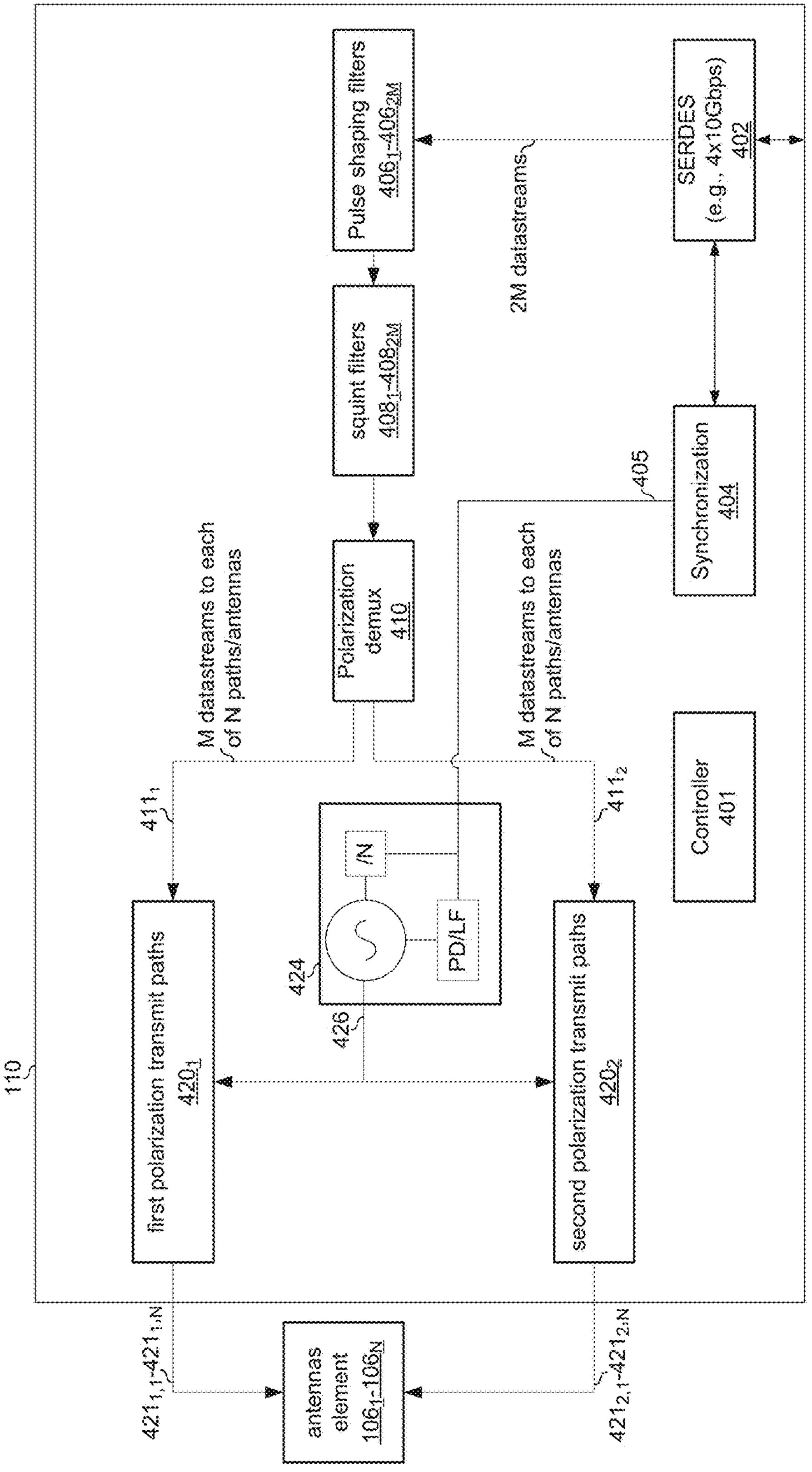
FIG. 4A shows an example transmitter operable to perform layered cross-polarization interference suppression.

As shown in FIG. 1B, an example unit cell 108 of a transceiver array 100 comprises a plurality of antenna elements 106 (e.g., four antenna elements per unit cell 108 in the examples of FIGS. 1B and 2B; and 'N' per unit cell in the example of FIG. 4A), a transceiver circuit 110, and, for a time-division-duplexing (TDD) implementation, a plurality of transmit/receive switches 108. The respective power amplifiers (PAs) for each of the four antenna elements $\mathbf{106}_1$-$\mathbf{106}_4$ are not shown explicitly in FIG. 1B but may, for example, be integrated on the circuit 110 (as shown, for example, in FIG. 4B, below) or may reside on a dedicated chip or subassembly. The antenna elements 106, circuit 110, and circuit 108 may be mounted to a printed circuit board (PCB) 112 (or other substrate). The components shown in FIG. 1B are referred to herein as a "unit cell" because multiple instances of this unit cell 108 may be ganged together to form a larger transceiver array 100. In this manner, the architecture of a transceiver array 100 in accordance with various implementations of this disclosure may be modular and scalable. FIGS. 2A and 2B, for example, illustrate an implementation in which four unit cells 108, each having four antenna elements 106 and a transceiver circuit 110, have been ganged together to form a transceiver array 100 comprising sixteen antenna elements 106 and four transceiver circuits 110. The various unit cells 108 are coupled via lines 202 which, in an example implementation represent one or more data busses (e.g., high-speed serial busses similar to what is used in backplane applications) and/or one or more clock distribution traces (which may be referred to as a "clock tree").

Use of an array of antenna elements 106 enables beamforming for generating a radiation pattern having one or more high-gain beams. In general, any number of transmit and/or receive beams are supported.

In an example implementation, each of the antenna elements 106 of a unit cell 108 is a horn mounted to a printed circuit board (PCB) 112 with waveguide feed lines 114. The circuit 110 may be mounted to the same PCB 112. In this manner, the feed lines 114 to the antenna elements may be kept extremely short. For example, the entire unit cell 108 may be, for example, 6 cm by 6 cm such that length of the feed lines 114 may be on the order of centimeters. The horns may, for example, be made of molded plastic with a metallic coating such that they are very inexpensive. In another example implementation, the antenna elements 106 may be, for example, stripline or microstrip patch antennas.

The ability of the transceiver array 100 to use beamforming to simultaneously receive from multiple of the satellites 102 may enable soft handoffs of the transceiver array 110 between satellites 102. Soft handoff may reduce downtime as the transceiver array 100 switches from one satellite 102 to the next. This may be important because the satellites 102 may be orbiting at speeds such that any particular satellite 102 only covers the transceiver array 100 for on the order of 1 minute, thus resulting in very frequent handoffs. For example, satellite $\mathbf{102}_3$ may be currently providing primary coverage to the transceiver array 100 and satellite $\mathbf{102}_1$ may be the next satellite to come into view after satellite $\mathbf{102}_3$. The transceiver array 100 may be receiving data via beam $\mathbf{104}_3$ and transmitting data via beam 106 while, at the same time, receiving control information (e.g., a low data rate beacon comprising a satellite identifier) from satellite $\mathbf{102}_1$ via beam $\mathbf{104}_1$. The transceiver array 100 may use this control information for synchronizing circuitry, adjusting beamforming coefficients, etc., in preparation for being handed-off to satellite $\mathbf{102}_1$. The satellite to which the transceiver array 100 is transmitting may relay messages (e.g., ACKs or retransmit requests) to the other satellites from which transceiver array 100 is receiving.

A transceiver array 100 may be operable to support multiple communications on multiple polarizations. In this regard, each beam may be characterized by its azimuthal angle (θ), its elevation angle (ϕ), its frequency (f), its timeslot (t), and its polarization (p). For example, a transceiver 100 may be operable to transmit two beams during the same timeslot and on the same frequency, but with different polarizations (e.g., right hand circularly polarized (RHCP) and left hand circularly polarized (LHCP)). One drawback of using multiple polarizations, however, is interference between the two beams (cross-polarization interference) resulting from the inevitable non-idealities of the system. In accordance with aspects of this disclosure, such interference is suppressed through use of systematic transmit-side cross-polarization interference suppression, systematic receive-side systematic cross-polarization interference suppression, and dynamic receive-side cross-polarization interference suppression. In accordance with aspects of this disclosure, each of these three "layers" may be enabled and disabled on an as-needed basis based on a variety of factors.

FIG. 4A depicts transmit circuitry of an example implementation of the unit cell of FIG. 1B. In the example implementation shown, circuit 110 comprises a SERDES interface circuit 402, synchronization circuit 404, local oscillator generator 424, pulse shaping filters $\mathbf{406}_1$-$\mathbf{406}_{2M}$ (M being an integer greater than or equal to 1), squint filters $\mathbf{408}_1$-$\mathbf{408}_{2M}$, and transmit paths $\mathbf{420}_1$ and $\mathbf{420}_2$. The outputs of the transmit paths $\mathbf{420}_1$ and $\mathbf{420}_2$ drive antenna elements $\mathbf{106}_1$-$\mathbf{106}_N$.

The SERDES interface circuit 402 is operable to exchange data with other instance(s) of the circuit 110 and other circuitry (e.g., a CPU) of the device 116.

The synchronization circuit 404 is operable to aid synchronization of a reference clock of the circuit 110 with the reference clocks of other instance(s) of the circuit 110 of the transceiver array 100.

The local oscillator generator 424 generates one or more local oscillator signals 426 based on the reference signal 405.

The pulse shaping filters $\mathbf{406}_1$-$\mathbf{406}_{2M}$ are operable to receive bits to be transmitted from the SERDES interface circuit 402 and shape the bits before conveying them to the squint processing filters $\mathbf{408}_1$-$\mathbf{408}_{2M}$. In an example implementation, each pulse shaping filter $\mathbf{406}_m$ ($1 \le m \le 2M$) processes a respective one of 2M datastreams from the SERDES interface circuit 402.

Each of the squint filters $\mathbf{408}_1$-$\mathbf{408}_{2M}$ is operable to compensate for squint effects which may result from bandwidth of the datastreams being wide relative to the center frequency.

The polarization demultiplexer 410 routes M of the datastreams to the first polarization transmit path $\mathbf{420}_1$ and the other M of the datastreams to the second polarization transmit path $\mathbf{420}_2$.

Each of the transmit paths $\mathbf{420}_P$ (where P is 1 or 2) is operable to process the signals $\mathbf{411}_P$ to generate N signals $\mathbf{420}_{P,1}$-$\mathbf{420}_{P,N}$ for driving the antenna elements $\mathbf{106}_1$-$\mathbf{106}_N$. Example details of transmit path $\mathbf{420}_P$ are described below with reference to FIG. 4B.

Figure 4B:
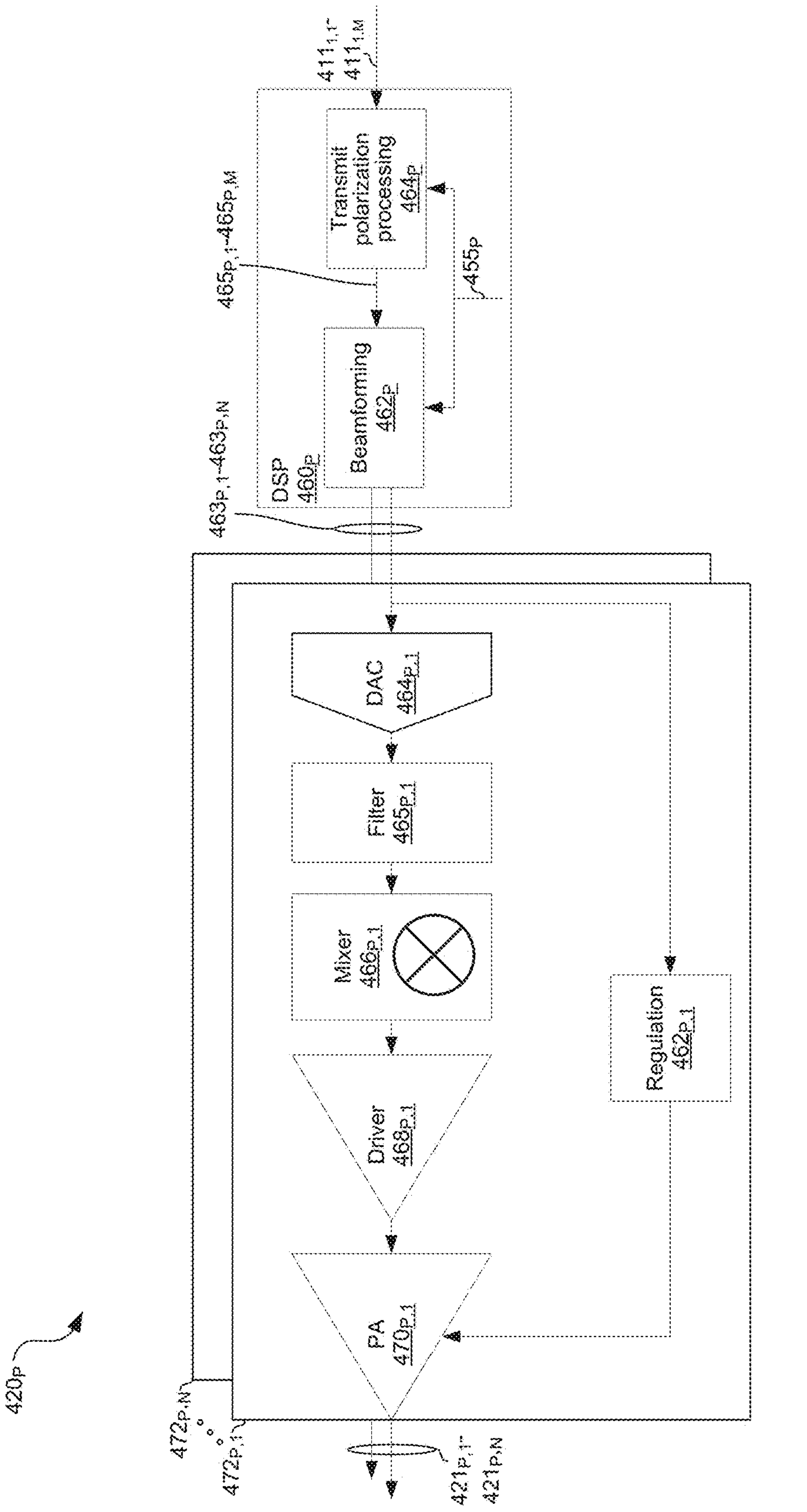
FIG. 4B shows an example implementation of the transmit paths of FIG. 4A.

FIG. 4B shows an example implementation of the transmit paths of FIG. 4A. The example transmit path $\mathbf{420}_P$ comprises digital signal processing circuitry $\mathbf{460}_P$, and a plurality of analog front-ends $\mathbf{472}_{P,1}$-$\mathbf{472}_{P,N}$. Each analog front-end $\mathbf{472}_{P,n}$ ($1 \le n \le N$) comprises a digital-to-analog converter (DAC) $\mathbf{462}_{P,n}$, filter $\mathbf{464}_{P,n}$, mixer $\mathbf{466}_{P,n}$, driver $\mathbf{468}_{P,n}$, power amplifier (PA) $\mathbf{470}_{P,n}$, and regulation circuit $\mathbf{462}_{P,n}$.

The DSP circuitry $\mathbf{460}_P$ comprises beamforming circuitry $\mathbf{462}_P$ and transmit polarization processing circuitry $\mathbf{464}_P$.

The beamforming circuitry $\mathbf{462}_P$ is operable to perform operations such as applying phase and/or amplitude coefficients for beamforming. The DSP $\mathbf{460}_P$ may accordingly receive a control signal $\mathbf{455}_P$ which indicates the desired M transmit beams for polarization P (e.g., each characterized by an elevation and/or azimuthal angle) and/or the coefficients to be applied to achieve the desired beams for polarization P.

The transmit polarization processing circuitry $\mathbf{464}_P$ is operable to perform systematic transmit-side cross-polarization interference suppression. Example details of the transmit polarization processing circuitry $\mathbf{464}_P$ are described below with reference to FIG. 4C.

Each DAC $\mathbf{462}_{P,n}$ is operable to convert a digital signal output by DSP $\mathbf{460}_P$ to a corresponding analog representation.

Each filter 464$_{P,n}$ is operable to filter out aliases generated by the corresponding DAC 462$_{P,n}$ which may reduce undesired mixing products generated by the corresponding mixer 466$_{P,n}$.

Each mixer 466$_{P,n}$ upconverts the signal to a carrier frequency (e.g., in one or more microwave or millimeter wave frequency band(s)).

Each driver 468$_{P,n}$ provides a stage of gain and/or impedance matching, and each power amplifier 470$_{P,n}$ provides a stage of gain.

Each regulation circuit 462$_{P,n}$ controls the supply voltage provided to the respective power amplifier 462$_{P,n}$ based on the signal output by the DSP circuit 460$_{P}$. The regulation circuit 462$_{P,n}$ may reduce the supply voltage to the PA 470$_{P,n}$ when the PA 470$_{P,n}$ is driving a weaker signal. In some instances, the regulation circuit 462$_{P,n}$ may reduce the supply voltage to 0 V (i.e., completely shut down the PA 470$_{P,n}$) to reduce power consumption when the PA 470$_{P,n}$ is not needed. For example, during a time interval in which polarization P is not being used for transmission (e.g., because current network usage/bandwidth requirements are low), then the PAs 470$_{P,1}$-470$_{P,N}$ may all be shut down during such time interval.

Figure 4C:
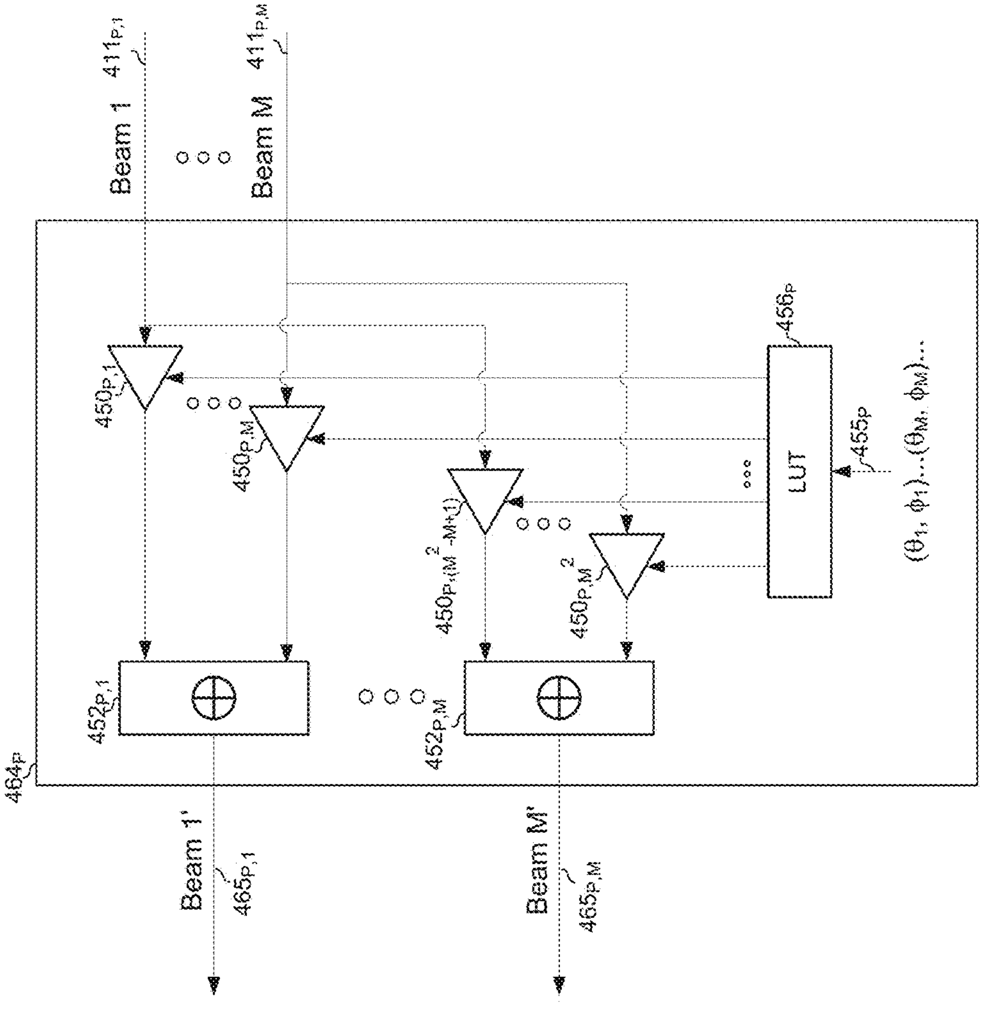
FIG. 4C shows an example implementation of the polarization processing circuitry of FIG. 4B.

FIG. 4C shows an example implementation of the polarization processing circuitry of FIG. 4B. The example polarization processing circuitry 464$_{P}$ comprises a plurality of scaling circuits 450$_{P,1}$-450$_{P,M}{}^{2}$, a plurality of combiner circuits 452$_{P,1}$-452$_{P,M}$, and a lookup table (LUT) circuit 456$_{P}$.

The LUT circuit 456$_{P}$ receives a control signal 455$_{P}$ indicating, for each beam m of the M beams ($1 \le m \le M$) to be transmitted: the azimuthal angle $\theta_m$ and the elevation angle $\phi_m$. As mentioned above, at least some transmit cross-polarization interference may be systematic and determined by: characteristics (e.g., dimensions, materials, etc.) of the array 100, and by the angles of the transmitted beams. Accordingly, the systematic cross-polarization interference for various combinations of beams can be predetermined/predicted from mathematical analysis, simulation, and/or factory test. Settings of the scaling circuits 450$_{P,1}$-450$_{P,M}{}^{2}$ which best suppress this systematic interference can likewise be predetermined/predicted. The settings which best suppress the cross-polarization interference may be loaded into the LUT circuit 556$_{P}$ in the factory, in the field via a firmware update, and/or may adapt using a learning algorithm as the array ages, etc.

Each of the scaling circuits 450$_{P,1}$-450$_{P,M}{}^{2}$ comprises, for example, a digital multiplier where the amount by which the input signal is multiplied (the gain) is set by a control signal from the LUT circuit 456$_{P}$.

Each of the combiner circuits 452$_{P,1}$-452$_{P,M}$ is operable to combine (e.g., sum) the outputs of a respective M of the scaling circuits 450$_{P,1}$-450$_{P,M}{}^{2}$ to generate a respective one of compensated signals 1' to M'.

In operation, the LUT circuitry 456$_{P}$ retrieves gain settings stored in one or more LUT entries at the LUT index(es) corresponding to the value(s) of the control signal 455$_{P}$, and outputs these gain settings to the scaling circuits 450$_{P,1}$-450$_{P,M}{}^{2}$. The M signals 411$_{P,1}$-411$_{P,M}$ to be output, respectively, on the M beams are then processed by the scaling circuits 450$_{P,1}$-450$_{P,M}{}^{2}$ and combined by combiner circuits 452$_{P,1}$-452$_{P,M}$ to generate compensated signals 465$_{P,1}$-465$_{P,M}$. In this manner, $$465_{P,1} = 411_{P,1} \times S_{P,1} + 411_{P,2} \times S_{P,2} \ldots + \ldots 411_{P,M} \times S_{P,M}$$

$$465_{P,2} = 411_{P,1} \times S_{P,(M+1)} + 411_{P,2} \times S_{P,(M+2)} \ldots + \ldots 411_{P,M} \times S_{P,(M+M)}$$

...

$$465_{P,M} = 411_{P,1} \times S_{P,(M^2-M+1)} + 411_{P,2} \times S_{P,(M^2-M+2)} \ldots + \ldots 411_{P,M} \times S_{P,(M^2)}$$

where $S_{p,1}$ is the gain of scaling circuit 450$_{P,1}$, $S_{P,2}$ is the gain of scaling circuit 450$_{P,2}$, and so on.

When compensated signals 465$_{P,1}$-465$_{P,M}$ are transmitted, the resulting cross-polarization interference is less than the cross-polarization interference that would occur if signals 411$_{P,1}$-411$_{P,M}$ were transmitted.

Figure 5A:
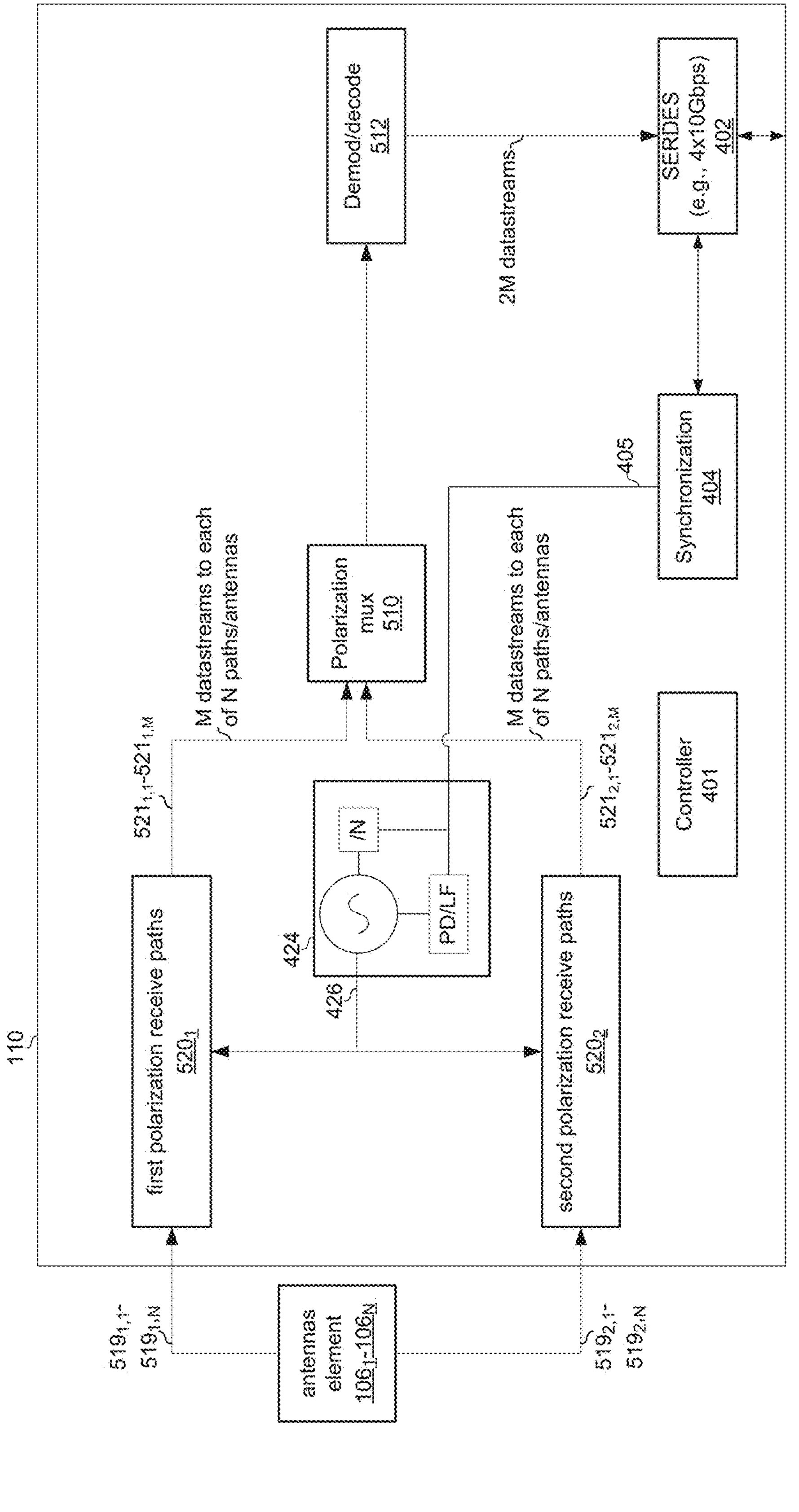
FIG. 5A shows an example receiver operable to perform layered cross-polarization interference suppression.

FIG. 5A shows an example receiver operable to perform layered cross-polarization interference suppression. In the example implementation shown, circuit 110 comprises the SERDES interface circuit 402, the synchronization circuit 404, the local oscillator generator 424, a polarization multiplexer 510, a plurality of receive paths 520$_{1}$ and 520$_{2}$, and a demodulation and decoding circuit 512. The inputs of the receive paths are connected to antenna elements 106$_{1}$-106$_{N}$.

Each receive paths 520$_{P}$ are operable to process N signals 519$_{P,1}$-519$_{P,N}$ of polarization. Example details of receive path 520$_{P}$ are described below with reference to FIG. 5B.

Figure 5B:
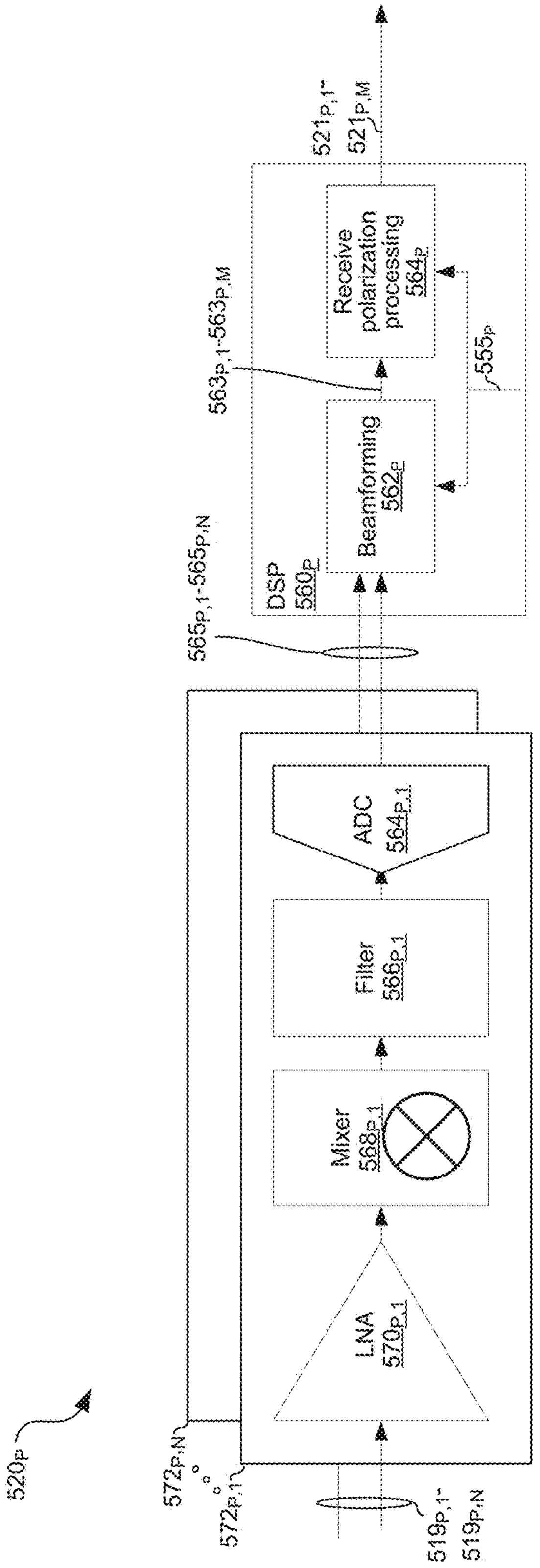
FIG. 5B shows an example implementation of the transmit paths of FIG. 5A.

FIG. 5B shows an example implementation of the transmit paths of FIG. 5A. The example transmit paths 520$_{P}$ comprise a plurality of analog-front-ends 572$_{P,1}$-572$_{P,N}$, and a DSP 560$_{P}$. Each analog-front-end 572$_{P,n}$ ($1 \le n \le N$) comprises a low-noise amplifier (LNA) 570$_{P,n}$, a mixer 568$_{P,n}$, a filter 566$_{P,n}$, and an analog-to-digital converter (ADC) 564$_{P,n}$.

Each LNA 470$_{P,n}$ provides a stage of gain for amplifying the received microwave or millimeter wave signal 519$_{P,n}$.

Each mixer 568$_{P,n}$ downconverts the signal from LNA 570$_{P,n}$ to baseband (or intermediate frequency in a heterodyne architecture).

Each filter 566$_{P,n}$ is operable to filter out produce generated by Mixer 568$_{P,1}$ which may reduce undesired aliases generated by the corresponding ADC 564$_{P,n}$.

Each ADC 564$_{P,n}$ is operable to convert an analog signal output by filter 566$_{P,n}$ to a corresponding digital representation.

The DSP circuitry 560$_{P}$ comprises beamforming circuitry 562$_{P}$ and receive polarization processing circuitry 564$_{P}$.

The beamforming circuitry 562$_{P}$ is operable to perform operations such as applying phase and/or amplitude coefficients for beamforming. The DSP 560$_{P}$ may accordingly receive a control signal 555$_{P}$ which indicates the desired M receive beams for polarization P (e.g., each characterized by an elevation and/or azimuthal angle) and/or the coefficients to be applied to achieve the desired receive beams for polarization P.

The receive polarization processing circuitry 564$_{P}$ is operable to perform systematic receive-side cross-polarization interference suppression and/or dynamic receive-side cross-polarization interference suppression. Example details of the receive polarization processing circuitry 564$_{P}$ are described below with reference to FIGS. 5C and 5D.

Figure 5C:
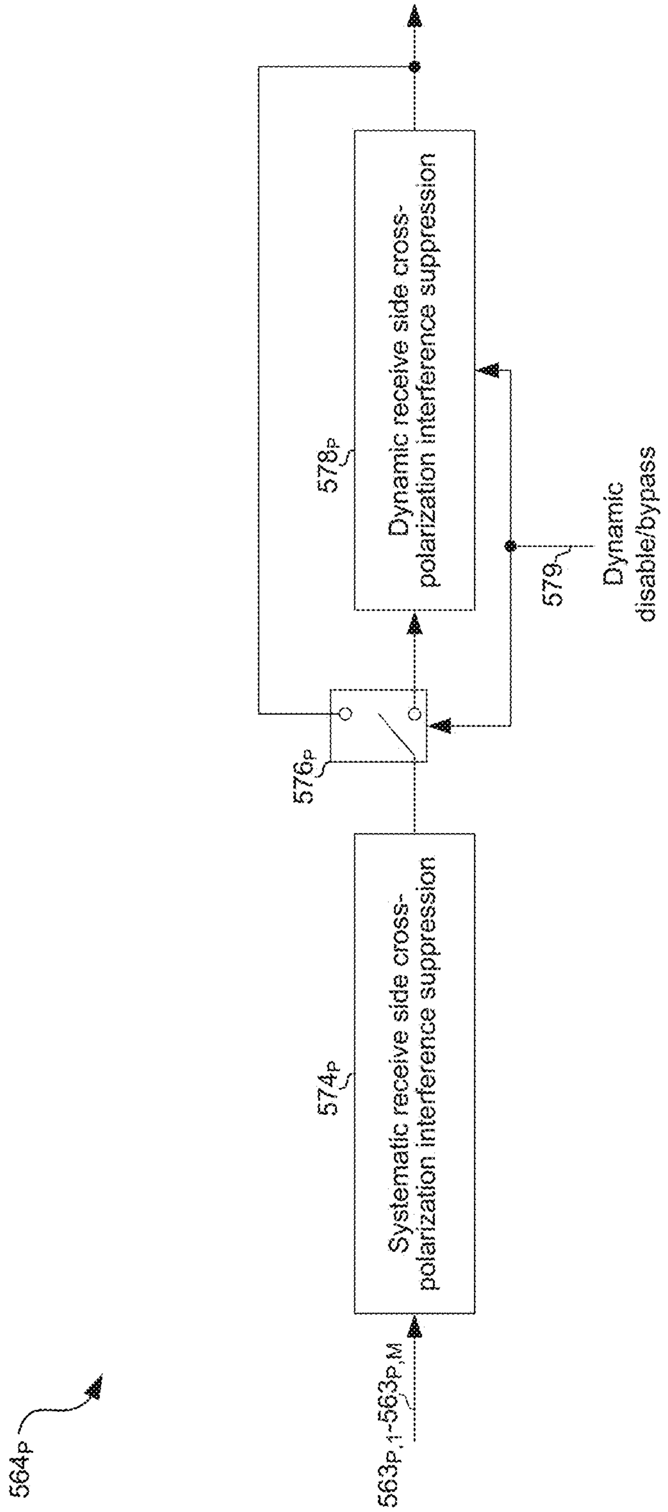
FIG. 5C shows an example implementation of the polarization processing circuitry of FIG. 5B.

FIG. 5C shows an example implementation of the polarization processing circuitry of FIG. 5B. The receive polarization processing circuitry 564$_{P}$ comprises systematic receive-side cross-polarization interference suppression circuitry 574$_{P}$ and dynamic receive side cross-polarization interference suppression circuitry 578$_{P}$.

The dynamic receive side cross-polarization interference suppression circuitry 578$_{P}$ may use techniques such as blind source separation for suppressing cross-polarization interference. Example techniques performed by the circuitry 578P are described in, for example, United States Patent Application Publication 2014-0003559 titled "Method and System for Improved Cross Polarization Rejection and Tolerating Coupling between Satellite Signals," which is hereby incorporated herein by reference. Example details of the systematic receive-side cross-polarization interference suppression circuitry $\mathbf{574}_P$ are described below with reference to FIG. 5D.

In operation, when the systematic transmit-side cross-polarization interference suppression (if used by a transmit from which the receiver is receiving) and/or the systematic receive-side cross-polarization interference suppression performed by circuitry $\mathbf{574}_P$ interference is sufficiently effective (e.g., an error rate is below a threshold), then signal 579 may configure the switch $\mathbf{576}_P$ such that the received signal bypasses circuitry $\mathbf{578}_P$ and powers down circuitry $\mathbf{578}_P$ to reduce energy consumption.

Figure 5D:
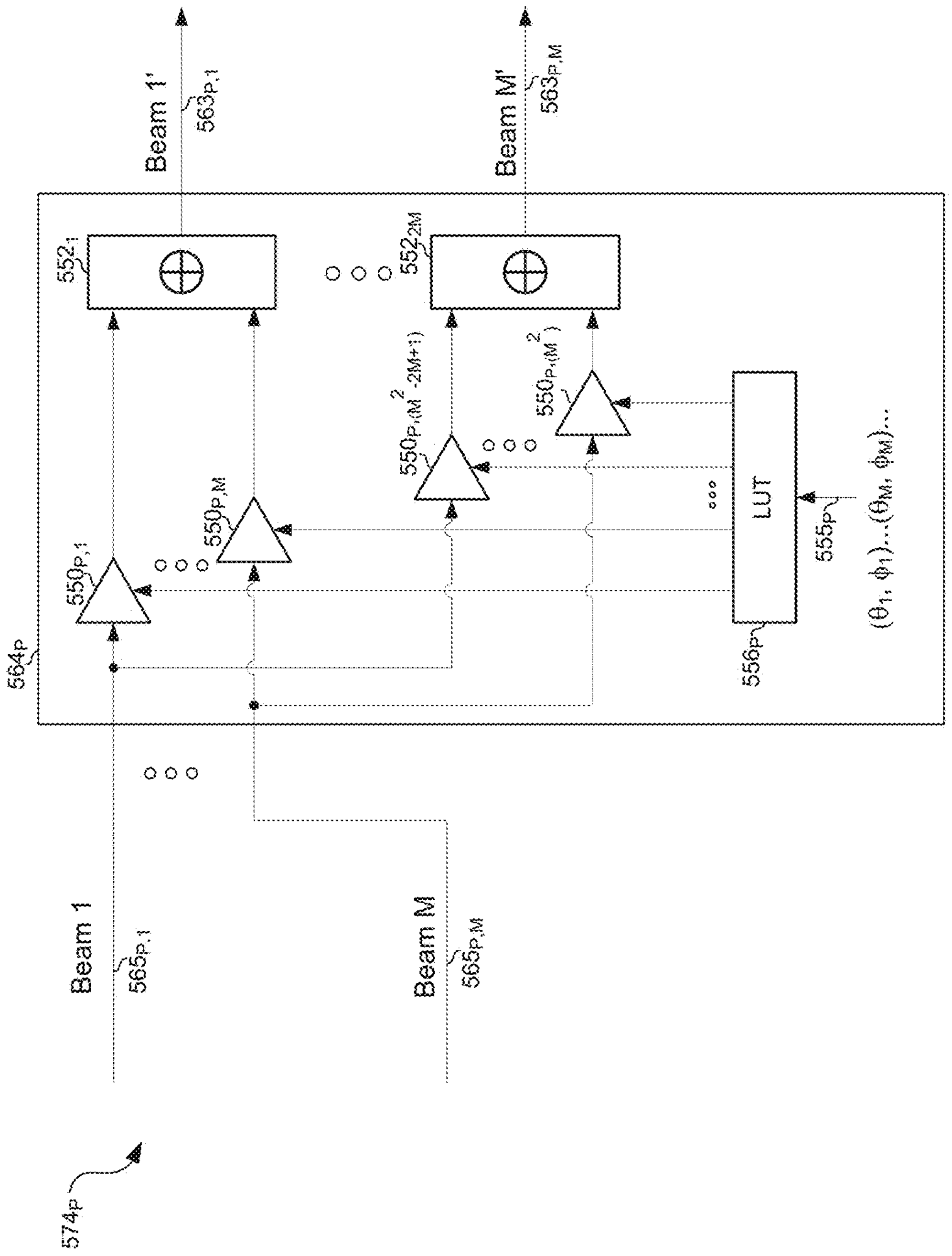
FIG. 5D shows an example implementation of the systematic receive-side cross-polarization interference suppression circuitry of FIG. 5C.

FIG. 5D shows an example implementation of the systematic receive-side cross-polarization interference suppression circuitry of FIG. 5C. The example receive-side cross-polarization interference suppression circuitry comprises a plurality of scaling circuits $\mathbf{550}_{P,1}$-$\mathbf{550}_{P,M}{}^2$, a plurality of combiner circuits $\mathbf{552}_{P,1}$-$\mathbf{452}_{P,M}$, and a lookup table (LUT) circuit $\mathbf{556}_P$.

The LUT circuit $\mathbf{556}_P$ receives a control signal $\mathbf{555}_P$ indicating, for each beam m of the M beams (1≤m≤M) to be transmitted: the azimuthal angle $\theta_m$ and the elevation angle $\theta_m$. As mentioned above, at least some receive side cross-polarization interference may be systematic and determined by: characteristics (e.g., dimensions, materials, etc.) of the array 100, and by the angles of the received beams. Accordingly, the systematic cross-polarization interference for various combinations of beams can be predetermined/predicted from mathematical analysis, simulation, and/or factory test. Settings of the scaling circuits $\mathbf{550}_{P,1}$-$\mathbf{550}_{P,M}{}^2$ which best suppress this systematic interference can likewise be predetermined/predicted. The settings which best suppress the cross-polarization interference may be loaded into the LUT circuit $\mathbf{556}_P$ in the factory, in the field via a firmware update, and/or may adapt using a learning algorithm as the array ages, etc.

Each of the scaling circuits $\mathbf{550}_{P,1}$-$\mathbf{550}_{P,M}{}^2$ comprises, for example, a digital multiplier where the amount by which the input signal is multiplied (the gain) is set by a control signal from the LUT circuit $\mathbf{556}_P$.

Each of the combiner circuits $\mathbf{552}_{P,1}$-$\mathbf{552}_{P,M}$ is operable to combine (e.g., sum) the outputs of a respective M of the scaling circuits $\mathbf{450}_{P,1}$-$\mathbf{450}_{P,M}{}^2$ to generate a respective one of compensated signals 1' to M'.

In operation, the LUT circuitry $\mathbf{556}_P$ retrieves gain settings stored in one or more LUT entries at the LUT index(es) corresponding to the value(s) of the control signal $\mathbf{555}_P$, and outputs these gain settings to the scaling circuits $\mathbf{550}_{P,1}$-$\mathbf{550}_{P,M}{}^2$. The M beams $\mathbf{565}_{P,1}$-$\mathbf{565}_{P,M}$ are then processed by the scaling circuits $\mathbf{550}_{P,1}$-$\mathbf{550}_{P,M}{}^2$ and combined by combiner circuits $\mathbf{552}_{P,1}$-$\mathbf{452}_{P,M}$ to generate compensated signals $\mathbf{563}_{P,1}$-$\mathbf{563}_{P,M}$. In this manner, $$563_{P,1}=565_{P,1}\times S_{P,1}+565_{P,2}\times S_{P,2}\ldots+\ldots 565_{P,M}\times S_{P,M}$$

$$563_{P,2}=565_{P,1}\times S_{P,(M+1)}+565_{P,2}\times S_{P,(M+2)}\ldots+\ldots 565_{P,M}\times S_{P,(M+M)}$$

$$\ldots$$

$$563_{P,M}=565_{P,1}\times S_{P,(M^2-M+1)}+565_{P,2}\times S_{P,(M^2-M+2)}\ldots+\ldots 565_{P,M}\times S_{P,(M^2)}$$

where $S_{p,m}$ is the gain of scaling circuit $\mathbf{550}_{P,m}$. The result is that compensated signals $\mathbf{563}_{P,1}$-$\mathbf{563}_{P,M}$ have less cross-polarization interference than signals $\mathbf{565}_{P,1}$-$\mathbf{565}_{P,M}$.

FIGS. 6A-6E illustrate various communication scenarios where the ground stations and satellites are operable to communicate using multiple polarizations. In an example implementation transceiver arrays 100*a* and 100*b* in FIGS. 6A-6E are ground stations and transceiver 100*c* is a satellite. In an example implementation transceiver arrays 100*a* and 100*b* in FIGS. 6A-6E are satellites stations and transceiver 100*c* is a ground station.

Figure 6A:
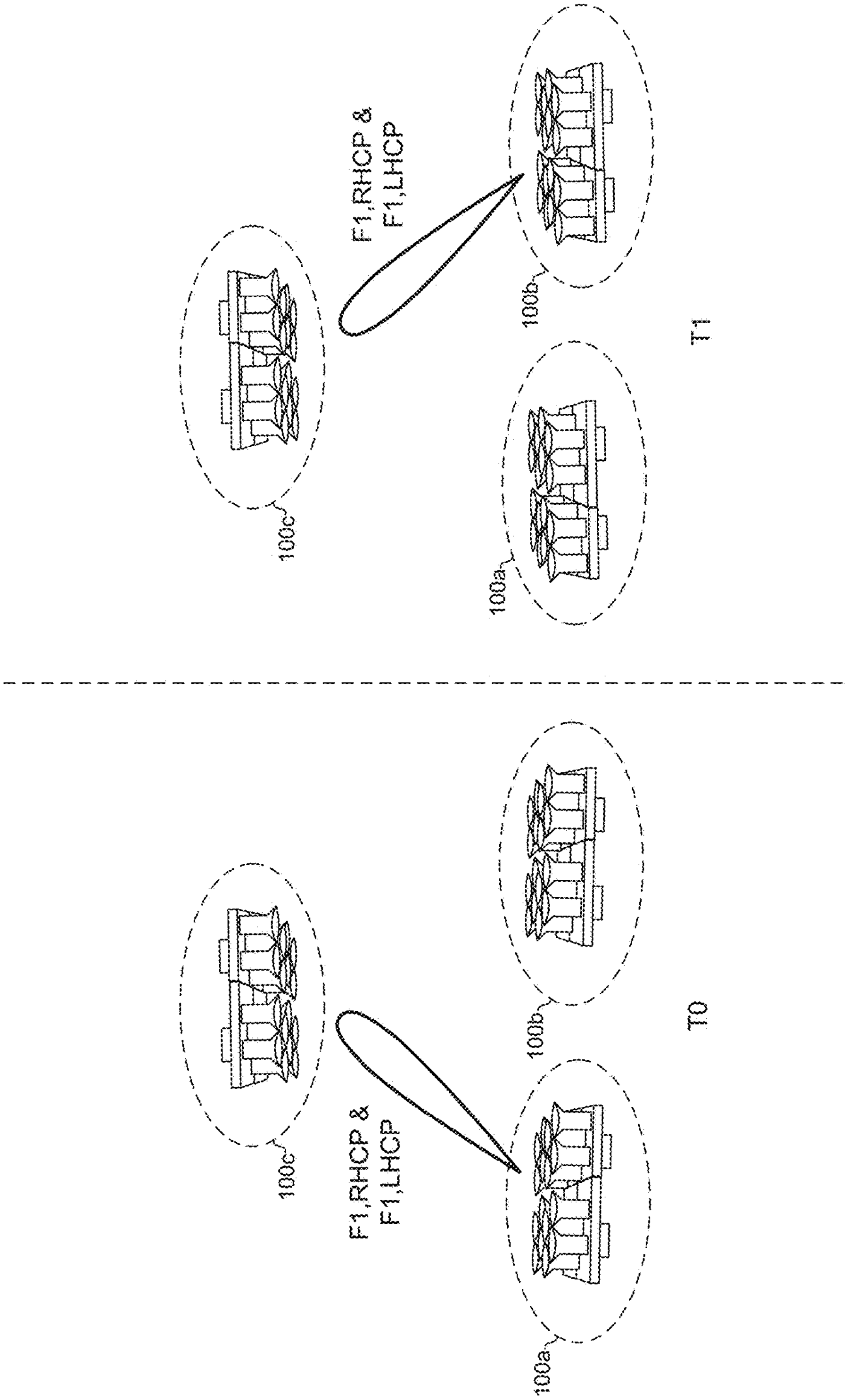
FIGS. 6A-6E illustrate various communication scenarios where the ground stations and satellites are operable to communicate using multiple polarizations.

In FIG. 6A, during a time interval T0, a first transceiver array 100*a* is transmitting to transceiver array 100*c* on a frequency F1 using both RCHP and LHCP. Then, in time interval T1 after T0, transceiver array 100*b* transmits to the transceiver array 100*c* on frequency F1 using both RHCP and LHCP. Because both polarizations on F1 are allocated to only one of the two transceivers 100*a* and 100*b* during any given timeslot, systematic transmit-side cross-polarization cancellation can be used by transceiver 100*a* during interval T0 and by transceiver 100*b* during interval T1, to suppress cross-polarization interference. When the systematic transmit-side (and receive-side, if transceiver array 100*c* is so equipped) cross-polarization interference is sufficiently effective (e.g., an error rate is below a threshold), the transceiver 100*c* may not need to enable dynamic receive-side cross-polarization interference suppression, and thus reduce power consumption. When the systematic interference suppression is not enough (e.g., an error rate is above a threshold), the transceiver array 100*c* may enable dynamic receive-side cross-polarization interference suppression.

Figure 6C:
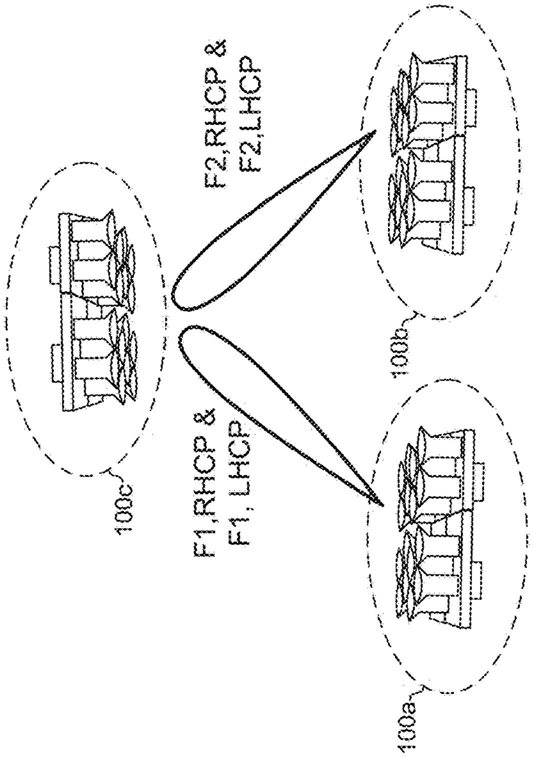
Figure 6B:
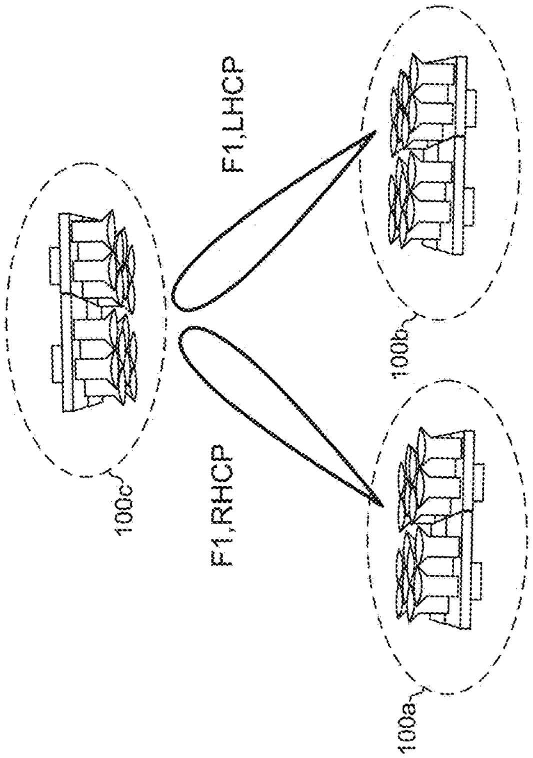

In FIG. 6B, both transceiver arrays 100*a* and 100*b* are transmitting to transceiver array 100*c* on a frequency F1, each using only one of the two polarizations. Because the different polarizations are being used by different transmitters, systematic transmit-side cross-polarization interference cancellation may not be feasible. Nevertheless, since 100*c* is receiving both polarizations, systematic receive-side cross-polarization interference cancellation may be used to suppress cross-polarization interference. When the systematic receive-side cross-polarization interference is sufficiently effective (e.g., an error rate is below a threshold), the transceiver 100*c* may not need to enable dynamic receive-side cross-polarization interference suppression, and thus reduce power consumption. When the systematic receive-side interference suppression is not enough (e.g., an error rate is above a threshold), the transceiver array 100*c* may enable dynamic receive-side cross-polarization interference suppression.

FIG. 6C illustrates a scenario similar to FIG. 6B but where the two transceiver arrays 100*a* and 100*b* are allocated different frequencies such that each can concurrently transmit on both polarizations and take advantage of systematic transmit-side cross-polarization suppression.

Figure 6D:
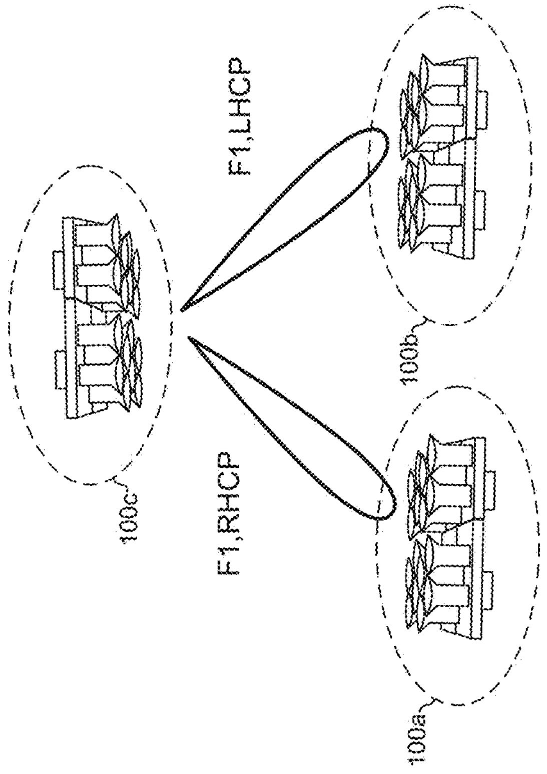

In FIG. 6D, transceiver array 100*c* is transmitting to both transceiver arrays 100*a* and 100*b* on a frequency F1, each using only one of the two polarizations. Because the different polarizations are being received by different receivers, systematic receive-side cross-polarization interference cancellation may not be feasible. Nevertheless, since 100*c* is transmitting both polarizations, systematic transmit-side cross-polarization interference cancellation may be used to suppress cross-polarization interference. For each of the transceivers 100*a* and 100*b*, when the systematic transmit-side cross-polarization interference is sufficiently effective (e.g., an error rate is below a threshold), that transceiver may not need to enable dynamic receive-side cross-polarization interference suppression, and thus reduce power consumption. For each of the transceivers 100*a* and 100*b*, when the systematic transmit-side interference suppression is not enough (e.g., an error rate is above a threshold), that transceiver may enable dynamic receive-side cross-polarization interference suppression.

Figure 6E:
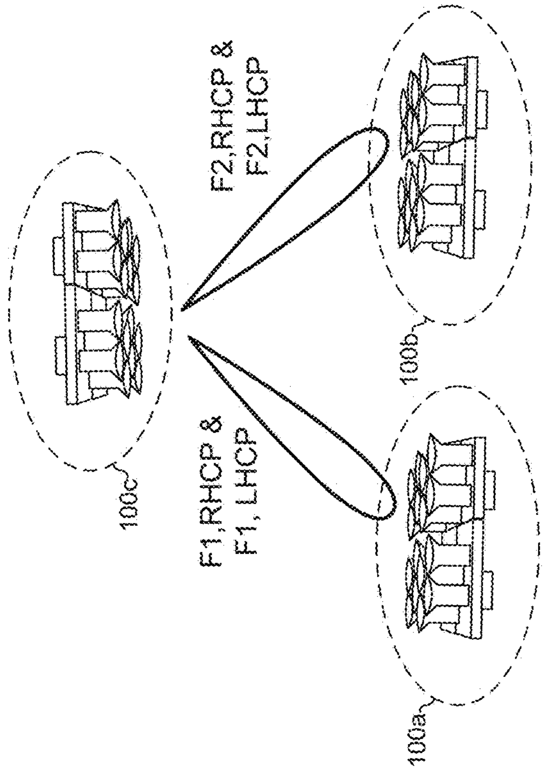

FIG. 6E illustrates a scenario similar to FIG. 6D but where the transceiver 100*c* transmits to arrays 100*a* and 100*b* on different frequencies such that it can concurrently transmit on both polarizations to each, and take advantage of systematic transmit-side cross-polarization suppression for both links.

Figure 7:
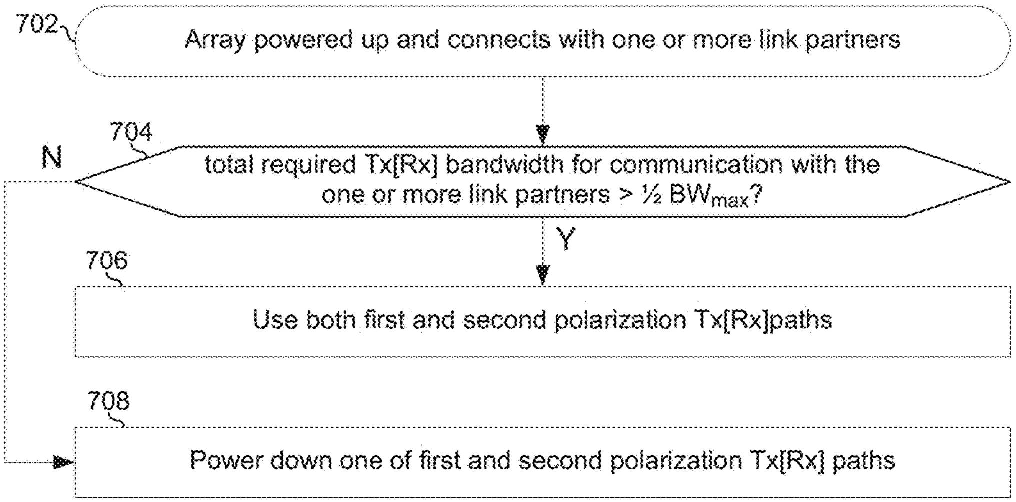
FIGS. 7 and 8 are flowcharts illustrating example processes for managing energy consumption of a transceiver array that supports communications on multiple polarizations.

FIG. 7 is a flowchart illustrating example processes for managing energy consumption of a transceiver array that supports communications on multiple polarizations. In block 702, an array 100 is powered up and connects with one or more link partners (e.g., with one or more ground stations if it is part of a satellite or one or more satellites if it is in a ground station). In block 704, the array (e.g., control circuitry 401, which may be a state machine, PIC, ARM-based processor, and/or the like) determines whether the total bandwidth required for transmitting with the link partner(s) is above ½ of the maximum bandwidth supported by the array 100. If so, then in block 706 both first polarization transmit paths $\mathbf{420}_1$ and second polarization transmit paths $\mathbf{420}_2$ are powered up, enabled, and used for transmitting to the link partner(s). Returning to block 704, if the total required bandwidth is not greater than ½ the maximum supported bandwidth, then in block 708, a power savings mode may be entered and one of the first polarization transmit paths $\mathbf{420}_1$ and the second polarization transmit paths $\mathbf{420}_2$ is powered down or disabled and only one of first polarization transmit paths $\mathbf{420}_1$ and the second polarization transmit paths $\mathbf{420}_2$ is used for transmitting to the link partner(s).

A similar process may be performed for receiving from the link partner(s). That is, one of the first polarization receive paths $\mathbf{520}_1$ and second polarization receive paths $\mathbf{520}_2$ may be powered down or disabled to save power when the array 100 does not need to receive more than half of the maximum supported bandwidth.

Figure 8:
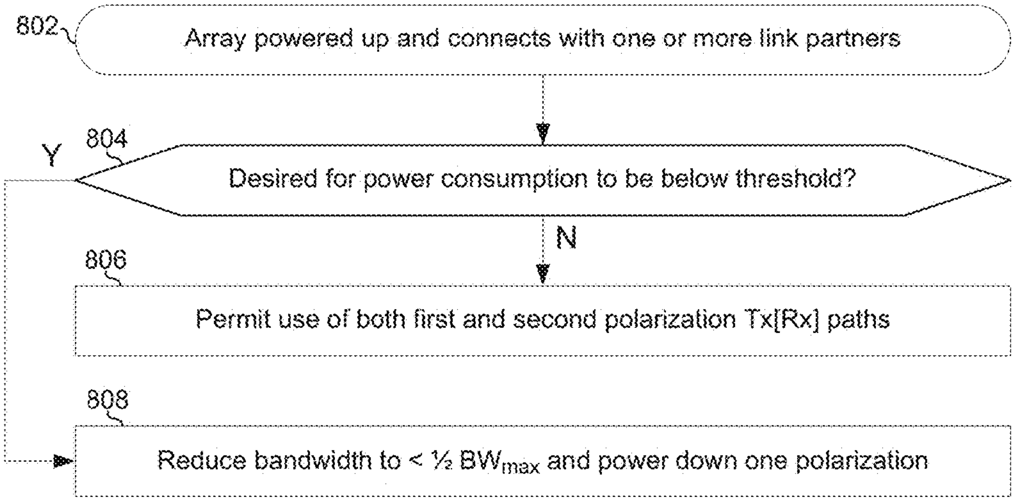

FIG. 8 is a flowchart illustrating example processes for managing energy consumption of a transmitter array that supports communications on multiple polarizations. In block 802, an array 100 is powered up and connects with one or more link partners (e.g., with one or more ground stations if it is part of a satellite or one or more satellites if it is in a ground station). In block 804, the array (e.g., control circuitry 401, which may be a state machine, PIC, ARM-based processor, and/or the like) determines whether a low power mode is required, e.g., it is desired for power consumption to be below a determined threshold. For example, it may be desired for power consumption to be below the threshold when the array 100 is operating on battery and trying to extend battery life. As another example, it may be desired for power consumption to be below the threshold when the temperatures are above a determined threshold. If it is not desired for power consumption to be below the threshold, then in block 806 use of both polarizations for transmit and/or receive may be permitted. Returning to block 804, if it is desired for power consumption to be below the threshold, then in block 808 the array 100 may reduce the transmit and/or receive bandwidth to below ½ the maximum supported bandwidth and turn off or disable one of the first polarization transmit paths $\mathbf{420}_1$ and second polarization transmit paths $\mathbf{420}_2$ and/or turn off or disable one of the first polarization receive paths $\mathbf{520}_1$ and second polarization receive paths $\mathbf{520}_2$.

As utilized herein the terms “circuits” and “circuitry” refer to physical electronic components (i.e. hardware) and any software and/or firmware (“code”) which may configure the hardware, be executed by the hardware, and or otherwise be associated with the hardware. As used herein, for example, a particular processor and memory may comprise a first “circuit” when executing a first one or more lines of code and may comprise a second “circuit” when executing a second one or more lines of code. As utilized herein, “and/or” means any one or more of the items in the list joined by “and/or”. As an example, “x and/or y” means any element of the three-element set {(x), (y), (x, y)}. In other words, “x and/or y” means “one or both of x and y”. As another example, “x, y, and/or z” means any element of the seven-element set {(x), (y), (z), (x, y), (x, z), (y, z), (x, y, z)}. In other words, “x, y and/or z” means “one or more of x, y and z”. As utilized herein, the term “exemplary” means serving as a non-limiting example, instance, or illustration. As utilized herein, the terms “e.g.,” and “for example” set off lists of one or more non-limiting examples, instances, or illustrations. As utilized herein, circuitry is “operable” to perform a function whenever the circuitry comprises the necessary hardware and code (if any is necessary) to perform the function, regardless of whether performance of the function is disabled or not enabled (e.g., by a user-configurable setting, factory trim, etc.).

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An array based communications system comprising:

a first polarization path comprising a first analog frequency conversion circuit, a first digital beamforming circuit, and a first cross-polarization interference suppression circuit;

a second polarization path comprising a second analog frequency conversion circuit, a second digital beamforming circuit, and a second cross-polarization interference suppression circuit; and an antenna array operably connected to the first polarization path and the second polarization path, wherein one of the first polarization path and the second polarization path is selectively enabled in accordance with a parameter associated with the array based communications system, and wherein the parameter associated with the array based communications system is a bandwidth required for communication with one or more link partners, and wherein the first polarization path and the second polarization path are both enabled when the bandwidth required for communication with one or more link partners is above half a maximum bandwidth supported by the antenna array.

2. The array based communications system of claim 1, wherein the parameter associated with the array based communications system is a power consumption.

3. The array based communications system of claim 2, wherein one of the first polarization path and the second polarization path is disabled when the power consumption is above a threshold.

4. The array based communications system of claim 2, wherein one of the first polarization path and the second polarization path is disabled when the power consumption is above a threshold and the array based communications system is operating on a battery.

5. The array based communications system of claim 2, wherein one of the first polarization path and the second polarization path is disabled when the power consumption is above a power threshold and a temperature of the array based communications system is above a temperature threshold.

6. The array based communications system of claim 1, wherein the first cross-polarization interference suppression circuit and the second cross-polarization interference suppression circuit are both used when the first polarization path and the second polarization path are both enabled.

7. The array based communications system of claim 1, wherein the first cross-polarization interference suppression circuit and the second cross-polarization interference suppression circuit are both disabled when at least one of the first polarization path and the second polarization path is disabled.

8. A method for array based communications, the method comprising:

enabling a first polarization path comprising a first analog frequency conversion circuit, a first digital beamforming circuit, and a first cross-polarization interference suppression circuit;

enabling a second polarization path comprising a second analog frequency conversion circuit, a second digital beamforming circuit, and a second cross-polarization interference suppression circuit;

determining whether a low power mode is required for an antenna array, wherein determining whether a low power mode is comprises comparing a maximum bandwidth supported by the antenna array to a bandwidth required for communication with one or more link partners; and disabling one of the first polarization path and the second polarization path if the low power mode is required.

9. The method for array based communications of claim 8, wherein the first polarization path and the second polarization path remain enabled when the bandwidth required for communication with one or more link partners is above half the maximum bandwidth supported by the antenna array.

10. The method for array based communications of claim 8, wherein the low power mode is required when the bandwidth for communication with one or more link partners is below half the maximum bandwidth supported by the antenna array.

11. The method for array based communications of claim 8, wherein the low power mode is based on a power consumption.

12. The method for array based communications of claim 11, wherein the low power mode is required when the power consumption is above a threshold.

13. The method for array based communications of claim 11, wherein the low power mode is required when the power consumption is above a threshold and the antenna array is operating on a battery.

14. The method for array based communications of claim 11, wherein the low power mode is required when the power consumption is above a power threshold and a temperature of the antenna array is above a temperature threshold.

15. The method for array based communications of claim 8, wherein the method comprises suppressing cross-polarization interference using the first cross-polarization interference suppression circuit and the second cross-polarization interference suppression circuit when the first polarization path and the second polarization path are both enabled.

16. The method for array based communications of claim 8, wherein the method comprises disabling both the first cross-polarization interference suppression circuit and the second cross-polarization interference suppression circuit when at least one of the first polarization path and the second polarization path is disabled.

17. An array based communications system comprising:

a first polarization path comprising a first analog frequency conversion circuit, a first digital beamforming circuit, and a first cross-polarization interference suppression circuit;

a second polarization path comprising a second analog frequency conversion circuit, a second digital beamforming circuit, and a second cross-polarization interference suppression circuit; and an antenna array operably connected to the first polarization path and the second polarization path, wherein one of the first polarization path and the second polarization path is selectively enabled in accordance with a parameter associated with the array based communications system, and wherein the parameter associated with the array based communications system is a bandwidth required for communication with one or more link partners, and wherein one of the first polarization path and the second polarization path is disabled when the bandwidth required for communication with one or more link partners is below half a maximum bandwidth supported by the antenna array.

18. The array based communications system of claim 17, wherein the parameter associated with the array based communications system is a power consumption.

19. The array based communications system of claim 18, wherein one of the first polarization path and the second polarization path is disabled when the power consumption is above a threshold.

20. The array based communications system of claim 18, wherein one of the first polarization path and the second polarization path is disabled when the power consumption is above a threshold and the array based communications system is operating on a battery.

21. The array based communications system of claim 18, wherein one of the first polarization path and the second polarization path is disabled when the power consumption is above a power threshold and a temperature of the array based communications system is above a temperature threshold.

22. The array based communications system of claim 17, wherein the first cross-polarization interference suppression circuit and the second cross-polarization interference suppression circuit are both used when the first polarization path and the second polarization path are both enabled.

23. The array based communications system of claim 17, wherein the first cross-polarization interference suppression circuit and the second cross-polarization interference suppression circuit are both disabled when at least one of the first polarization path and the second polarization path is disabled.

24. An array based communications system comprising:

a first polarization path comprising a first analog frequency conversion circuit, a first digital beamforming circuit, and a first cross-polarization interference suppression circuit;

a second polarization path comprising a second analog frequency conversion circuit, a second digital beamforming circuit, and a second cross-polarization interference suppression circuit; and an antenna array operably connected to the first polarization path and the second polarization path, wherein one of the first polarization path and the second polarization path is selectively enabled in accordance with a parameter associated with the array based communications system, and wherein the parameter associated with the array based communications system is a power consumption, and wherein one of the first polarization path and the second polarization path is disabled when the power consumption is above a power threshold and a temperature of the array based communications system is above a temperature threshold.

25. The array based communications system of claim 24, wherein one of the first polarization path and the second polarization path is disabled when the power consumption is above a threshold and the array based communications system is operating on a battery.

26. The array based communications system of claim 24, wherein the first cross-polarization interference suppression circuit and the second cross-polarization interference suppression circuit are both used when the first polarization path and the second polarization path are both enabled.

27. The array based communications system of claim 24, wherein the first cross-polarization interference suppression circuit and the second cross-polarization interference suppression circuit are both disabled when at least one of the first polarization path and the second polarization path is disabled.

28. An array based communications system comprising:

a first polarization path comprising a first analog frequency conversion circuit, a first digital beamforming circuit, and a first cross-polarization interference suppression circuit;

a second polarization path comprising a second analog frequency conversion circuit, a second digital beamforming circuit, and a second cross-polarization interference suppression circuit; and an antenna array operably connected to the first polarization path and the second polarization path, wherein one of the first polarization path and the second polarization path is selectively enabled in accordance with a parameter associated with the array based communications system, and wherein the first cross-polarization interference suppression circuit and the second cross-polarization interference suppression circuit are both used when the first polarization path and the second polarization path are both enabled.

29. The array based communications system of claim 28, wherein the parameter associated with the array based communications system is a bandwidth required for communication with one or more link partners.

30. The array based communications system of claim 28, wherein the parameter associated with the array based communications system is a power consumption.

31. The array based communications system of claim 30, wherein one of the first polarization path and the second polarization path is disabled when the power consumption is above a threshold.

32. The array based communications system of claim 30, wherein one of the first polarization path and the second polarization path is disabled when the power consumption is above a threshold and the array based communications system is operating on a battery.

33. An array based communications system comprising:

a first polarization path comprising a first analog frequency conversion circuit, a first digital beamforming circuit, and a first cross-polarization interference suppression circuit;

a second polarization path comprising a second analog frequency conversion circuit, a second digital beamforming circuit, and a second cross-polarization interference suppression circuit; and an antenna array operably connected to the first polarization path and the second polarization path, wherein one of the first polarization path and the second polarization path is selectively enabled in accordance with a parameter associated with the array based communications system, and wherein the first cross-polarization interference suppression circuit and the second cross-polarization interference suppression circuit are both disabled when at least one of the first polarization path and the second polarization path is disabled.

34. The array based communications system of claim 33, wherein the parameter associated with the array based communications system is a bandwidth required for communication with one or more link partners.

35. The array based communications system of claim 33, wherein the parameter associated with the array based communications system is a power consumption.

36. The array based communications system of claim 35, wherein one of the first polarization path and the second polarization path is disabled when the power consumption is above a threshold.

37. The array based communications system of claim 35, wherein one of the first polarization path and the second polarization path is disabled when the power consumption is above a threshold and the array based communications system is operating on a battery.

38. A method for array based communications, the method comprising:

enabling a first polarization path comprising a first analog frequency conversion circuit, a first digital beamforming circuit, and a first cross-polarization interference suppression circuit;

enabling a second polarization path comprising a second analog frequency conversion circuit, a second digital beamforming circuit, and a second cross-polarization interference suppression circuit;

determining whether a low power mode is required for an antenna array, wherein the low power mode is based on a power consumption, and wherein the low power mode is required when the power consumption is above a power threshold and a temperature of the antenna array is above a temperature threshold; and disabling one of the first polarization path and the second polarization path if the low power mode is required.

39. The method for array based communications of claim 38, wherein the low power mode is required when the power consumption is above a threshold and the antenna array is operating on a battery.

40. The method for array based communications of claim 38, wherein the method comprises suppressing cross-polarization interference using the first cross-polarization interference suppression circuit and the second cross-polarization interference suppression circuit when the first polarization path and the second polarization path are both enabled.

41. The method for array based communications of claim 38, wherein the method comprises disabling both the first cross-polarization interference suppression circuit and the second cross-polarization interference suppression circuit when at least one of the first polarization path and the second polarization path is disabled.

42. A method for array based communications, the method comprising:

enabling a first polarization path comprising a first analog frequency conversion circuit, a first digital beamforming circuit, and a first cross-polarization interference suppression circuit;

enabling a second polarization path comprising a second analog frequency conversion circuit, a second digital beamforming circuit, and a second cross-polarization interference suppression circuit;

determining whether a low power mode is required for an antenna array;

disabling one of the first polarization path and the second polarization path if the low power mode is required; and suppressing cross-polarization interference using the first cross-polarization interference suppression circuit and the second cross-polarization interference suppression circuit when the first polarization path and the second polarization path are both enabled.

43. The method for array based communications of claim 42, wherein the low power mode is based on a power consumption.

44. The method for array based communications of claim 43, wherein the low power mode is required when the power consumption is above a threshold.

45. The method for array based communications of claim 43, wherein the low power mode is required when the power consumption is above a threshold and the antenna array is operating on a battery.

46. A method for array based communications, the method comprising:

enabling a first polarization path comprising a first analog frequency conversion circuit, a first digital beamforming circuit, and a first cross-polarization interference suppression circuit;

enabling a second polarization path comprising a second analog frequency conversion circuit, a second digital beamforming circuit, and a second cross-polarization interference suppression circuit;

determining whether a low power mode is required for an antenna array;

disabling one of the first polarization path and the second polarization path if the low power mode is required; and disabling both the first cross-polarization interference suppression circuit and the second cross-polarization interference suppression circuit when at least one of the first polarization path and the second polarization path is disabled.

47. The method for array based communications of claim 46, wherein the low power mode is based on a power consumption.

48. The method for array based communications of claim 47, wherein the low power mode is required when the power consumption is above a threshold.

49. The method for array based communications of claim 47, wherein the low power mode is required when the power consumption is above a threshold and the antenna array is operating on a battery.

* * * * *